W. A. RIDDELL.
CAMERA CARRIAGE.
APPLICATION FILED NOV. 21, 1917.
1,262,700.
Patented Apr. 16, 1918.
2 SHEETS—SHEET 1.
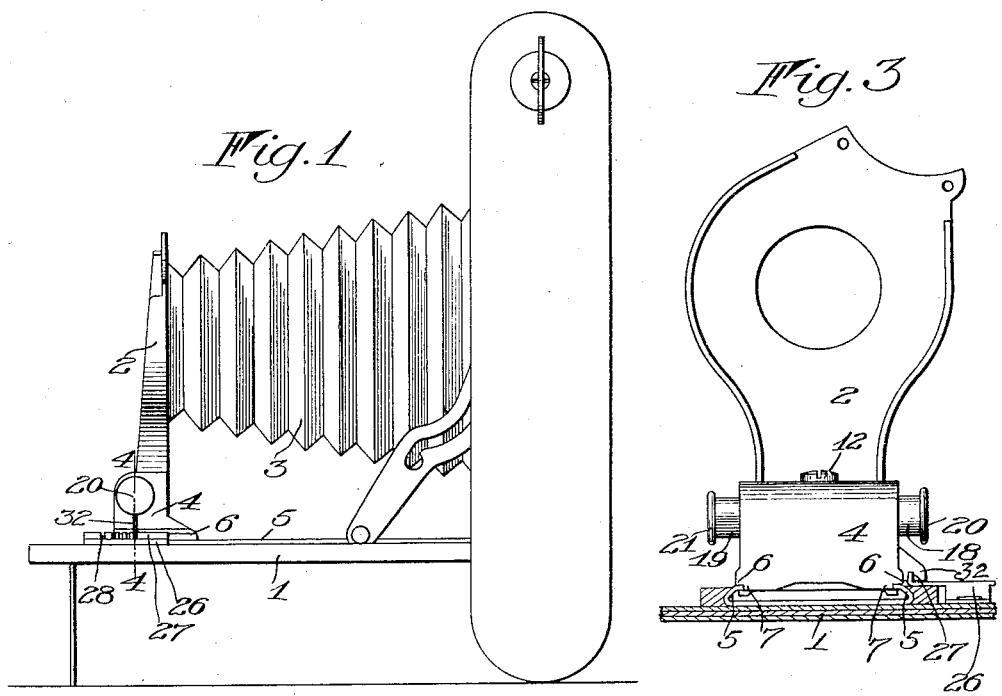
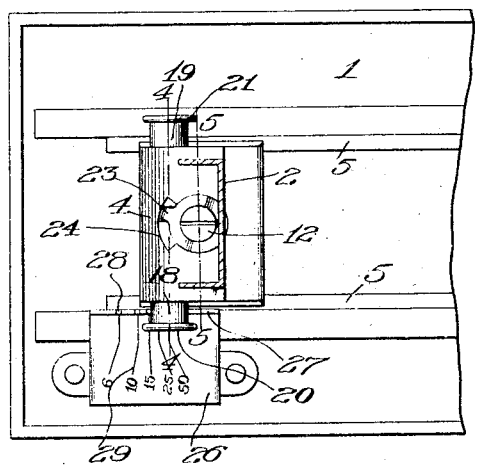
WITNESS
George D Powell
INVENTOR
William A. Riddell
BY Church & Rich
his ATTORNEYS

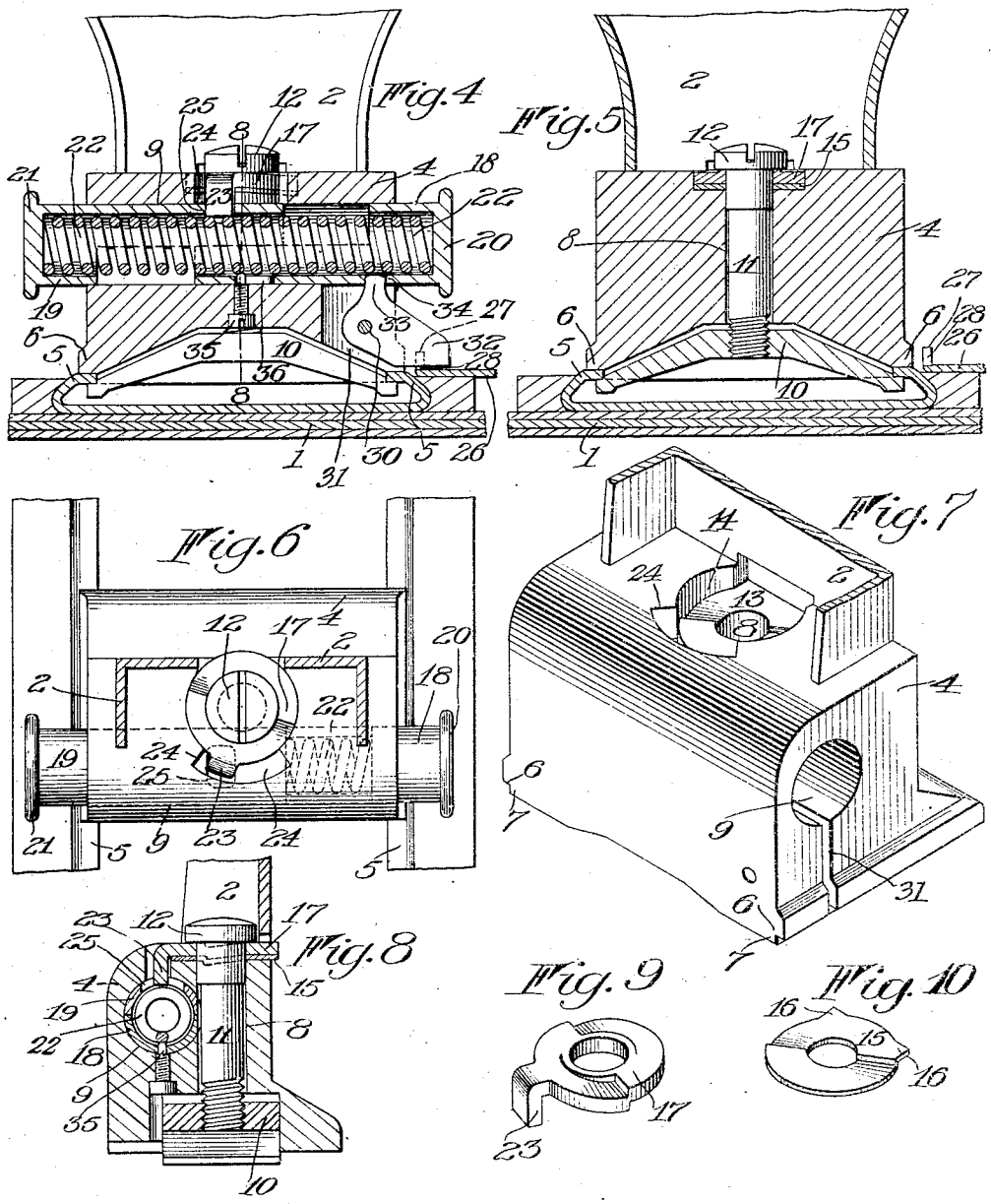

UNITED STATES PATENT OFFICE.

WILLIAM A. RIDDELL, OF ROCHESTER, NEW YORK, ASSIGNOR TO EASTMAN KODAK COMPANY, OF ROCHESTER, NEW YORK, A CORPORATION OF NEW YORK.

CAMERA-CARRIAGE.

1,262,700.        Specification of Letters Patent.        Patented Apr. 16, 1918.

Application filed November 21, 1917.   Serial No. 203,202.

*To all whom it may concern:*

Be it known that I, WILLIAM A. RIDDELL, of Rochester, in the county of Monroe and State of New York, have invented certain new and useful Improvements in Camera-Carriages; and I do hereby declare the following to be a full, clear, and exact description of the same, reference being had to the accompanying drawings, forming a part of this specification, and to the reference-numerals marked thereon.

My present invention relates to photography and more particularly to photographic cameras and it has for its object to provide simple and efficient means, conveniently operable, for accurately positioning the lens carriage or front at the desired point on the camera bed and for thereafter maintaining it rigidly in place. To these and other ends the invention resides in certain improvements and combinations of parts all as will be hereinafter more fully described, the novel features being pointed out in the claims at the end of the specification.

In the drawings:

Figure 1 is a side elevation of a camera provided with a lens carriage constructed in accordance with and illustrating one embodiment of my invention;

Fig. 2 is an enlarged fragmentary view of the forward portion of the camera bed taken in horizontal section through the camera front to show a plan of the carriage and bed;

Fig. 3 is an enlarged front view of the carriage showing a portion of the bed in section;

Fig. 4 is a further enlarged section through the carriage and a portion of the bed taken substantially on the line 4—4 of Fig. 2;

Fig. 5 is a similar section taken substantially on the line 5—5 of Fig. 2;

Fig. 6 is an enlarged fragmentary view similar to Fig. 2;

Fig. 7 is a perspective view of the carriage block;

Fig. 8 is a section taken substantially on the line 8—8 of Fig. 4, and

Figs. 9 and 10 are detail perspective views of certain elements of the locking mechanism.

Similar reference numerals throughout the several views indicate the same parts.

In the embodiment of the invention illustrated, 1 indicates a camera bed and 2 the front or lens board with which the bellows 3 is connected, said lens board being mounted on the carriage block 4.

The bed 1 is provided with undercut tracks indicated at 5 on which slide lips 6 on the carriage block while shoulders 7 on the latter project down between the tracks to prevent lateral movement.

The carriage block 4 is pierced centrally by a vertical bore or aperture 8 while forwardly thereof it is pierced by a horizontal transverse bore 9 (Fig. 7). A cross-head 10 having inclined ends as shown extends beneath both tracks 5 in a manner to clamp against them when raised, such cross-head being located beneath the carriage. Rigidly connected thereto is a stem 11 extending vertically through the aperture 8 in the carriage block and terminating in a head or shoulder 12 above the latter. A spiral or double cam 13 is formed in the block 4 at the bottom of a recess 14 to surround the aperture 8 and the stem 11. Resting on this cam rack is a similarly formed wear plate or spring washer 15 shown in detail in Fig. 10 having projections 16 that engage the walls of the recess 14 to prevent the washer from turning while on top of the latter is placed a rotary cam disk 17 (Fig. 9) that turns about the stem 8 beneath the head 12 thereof.

It will be obvious from an inspection of Figs. 7, 9 and 10 that, as the cam plate 17 is rotated to the right, it will ride upon the cam track and, reacting against the head 12 of the spindle, raise the cross head 10 so that it will clamp against the under sides of the tracks 5 in opposition to the carriage block 4 and lock the latter to the track in a fixed position on the bed. This locking position of the cross heads is its normal position and is maintained in the following manner: Slidable laterally in the horizontal bore 9 as a bearing are two opposed tubular thrust members 18 and 19 terminating in finger grips 20 and 21, respectively. These thrust members are cut away reciprocally to also slide upon each other as shown in Fig. 4 and they may be pressed inwardly when the thumb and fore finger are placed upon the two finger portions against the tension of an inclosed coil spring 22 that acts against both to project them outwardly. A downwardly projecting finger 23 on the cam disk 17 operates in a segmental slot 24 in the top of the block 4 that intersects the bore 9 and engages in a recess 25 in the tubular portion of the thrust member 19. Thus, the tendency of the spring 22 is to move the finger-piece 19 outwardly and rotate the cam disk 17 to the right which, as before described, raises the cross head 10 and locks the carriage. When the thrust member 19 is pressed inwardly, it rotates the cam disk 17 to the left and lowers the cross-head to the disengaged position permitting the carriage to be moved freely on the tracks, a slight spring in the wear plate or washer 15 preferably contributing to the certainty of this disengaging action.

Mounted on the bed 1 at one side of the tracks is a focusing stop plate 26 (Fig. 2) having a flange 27 provided with notches 28 forming a series of stops that identify different focal positions of the camera lens carried on the carriage. Associated with these stops are graduations 29 in units of focal distance. Pivoted at 30 (Fig. 4) in a slot 31 in the carriage block 4 is a vertically movable locking lever 32 that is adapted to engage, selectively, with the stop notches 28. An arm 33 on this lever engages in a socket or recess 34 in the thrust member 18 in such manner that, as the thrust member is pressed inwardly, the locking device 32 is raised out of engagement and as it is projected outwardly by the spring 20, the said locking device is moved into operative position with reference to the stop plate.

Therefore, as the finger-pieces 20 and 21 and their thrust members are pressed together to release the clamp 10 for sliding movement of the carriage, the locking member 32 is also released. In the operation of the device, this member 32 is brought over the desired notch 28 for the proper focus and then released which both clamps and locks the carriage accurately and solidly in position. The clamp holds the carriage closely and rigidly on the bed while the lever 32 is a positive lock preventing front and rear displacement and is better than a mere indicator as it engages in its notch only when the lens is accurately positioned.

The finger 23 limits the outward movement of the thrust member 19 and to similarly limit the outward movement of thrust member 18, I extend a set screw 35 up through the bottom of the carriage block 4 to coöperate with a slot 36 in said thrust member.

I claim as my invention:

1. In a camera, the combination with a bed, a track thereon, a lens carriage movable on the track and a series of stops on the bed having associated graduations in units of focal distance, of a transversely movable plunger in the carriage terminating in a finger-piece and a locking lever pivoted on the carriage to engage the stops and having an arm interlocked with the plunger for movement in both directions.

2. In a camera, the combination with a bed, a track thereon, a lens carriage movable on the track and having a transverse bearing and a series of stops on the bed having associated graduations in units of focal distance, of a tubular plunger slidable in the bearing in the carriage and terminating in a finger piece, said plunger having a recess in one side, a locking lever pivoted on the carriage to engage the stops and having an arm engaging in the recess in the plunger to move therewith in both directions and a spring within the plunger for operating it in an outward direction.

3. In a camera, the combination with a bed, a track thereon, a lens carriage movable on the track and a series of stops on the bed having associated graduations in units of focal distance, of means for clamping the carriage to the track, a locking device on the carriage adapted to selectively engage the stops and a common operating mechanism for the clamping means and locking device.

4. In a camera, the combination with a bed, a track thereon, a lens carriage movable on the track and a series of stops on the bed having associated graduations in units of focal distance, of means for clamping the carriage to the track, a locking device on the carriage adapted to selectively engage the stops, and a pair of transversely movable thrust members having finger pieces thereon, mounted on the carriage and connected, respectively, to actuate the clamping means and locking device when pressed together.

5. In a camera, the combination with a bed, a track thereon, a lens carriage movable on the track and a series of stops on the bed having associated graduations in units of focal distance, of means for clamping the carriage to the track, a locking device on the carriage adapted to selectively engage the stops, a pair of transversely movable thrust members having finger pieces thereon mounted on the carriage and connected, respectively, to actuate the clamping means and locking device when pressed together, and a spring common to both thrust members tending to press them outwardly.

6. In a camera, the combination with a bed, a track thereon, a lens carriage movable on the track and a series of stops on the bed having associated graduations in units of focal distance, of means for clamping the carriage to the track, a locking device on the carriage adapted to selectively engage the stops, a pair of transversely movable tubular thrust members having finger pieces thereon mounted on the carriage and connected, respectively, to actuate the clamping means and locking device when pressed together, and a spring housed within the thrust members and bearing against each to press them outwardly.

WILLIAM A. RIDDELL.

Witnesses:
HELEN M. FRASER,
MARGARET DUIGNAN.

Copies of this patent may be obtained for five cents each, by addressing the "Commissioner of Patents, Washington, D. C."